US006226297B1

United States Patent
Alexander et al.

(10) Patent No.: US 6,226,297 B1
(45) Date of Patent: May 1, 2001

(54) METHOD AND SYSTEM FOR PROVIDING REDUNDANCY TO ASYNCHRONOUS TRANSFER MODE EMULATED LOCAL-AREA NETWORKS

(75) Inventors: Cedell A. Alexander, Durham; J. Kevin Frick, Raleigh; Edward J. Rovner, Chapel Hill; Matthew B. Squire, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/017,306

(22) Filed: Jan. 30, 1998

Related U.S. Application Data

(60) Provisional application No. 60/036,528, filed on Jan. 30, 1997.

(51) Int. Cl.[7] ............................ G01R 31/08; G06F 11/00; H04J 1/16; H04L 12/28
(52) U.S. Cl. ............................ 370/401; 370/216; 370/218; 370/242; 370/409; 709/220; 709/223; 709/249
(58) Field of Search ............................ 370/216, 242, 370/218, 254, 257, 402, 409, 401, 404; 395/200.5, 200.11, 200.53, 200.79, 200.1; 709/220, 223, 249

(56) References Cited

U.S. PATENT DOCUMENTS

| 5,280,481 | | 1/1994 | Chang et al. . | |
|---|---|---|---|---|
| 5,323,388 | | 6/1994 | Chang et al. . | |
| 5,357,508 | | 10/1994 | Le Boudec et al. . | |
| 5,577,033 | | 11/1996 | Chang et al. . | |
| 5,581,552 | | 12/1996 | Civanlar et al. . | |
| 5,600,644 | * | 2/1997 | Chang et al. ........................ | 370/404 |
| 5,600,650 | | 2/1997 | Oskouy . | |
| 5,734,824 | * | 3/1998 | Choi ................................ | 395/200.11 |
| 5,805,805 | * | 9/1998 | Civanlar et al. ................... | 395/200.5 |
| 5,835,481 | * | 11/1998 | Akyol et al. ......................... | 370/216 |
| 5,949,753 | * | 9/1998 | Alexander, Jr. et al. ............ | 370/216 |
| 5,982,773 | * | 11/1999 | Nishimura et al. ................... | 370/395 |

OTHER PUBLICATIONS

Bill Ellington et al., "Implementing ATM Forum–Compliant Lan Emulation," IBM Corporation, Digital Communications Design Conference, 1996.

IBM Technical Disclosure Bulletin, "Method for Improving Network Availability With Redundant Network Servers," vol. 39, No. 8, Aug. 1996, pp. 195–196.

IBM Technical Disclosure Bulletin, "Addressing Source Routing in an ATM Emulated Lan," vol. 37, No. 10, Oct. 1994, pp. 75–80.

IBM Technical Disclosure Bulletin, "Transmission Control Protocol/Internet Protocol Networking Over Netbios," vol. 36, No. 12, Dec. 1993, pp. 619–620.

* cited by examiner

Primary Examiner—Huy D. Vu
Assistant Examiner—M. Phan
(74) Attorney, Agent, or Firm—Gerald R. Woods; Bracewell & Patterson, LLP

(57) ABSTRACT

A method for providing redundancy to an Asynchronous Transfer Mode (ATM) emulated local-area network (LAN) is disclosed. The ATM emulated LAN is served by a primary LAN Emulation Server, a Broadcast and Unknown Server (LES/BUS), and a LAN Emulation Configuration Server (LECS). A backup LES/BUS is coupled to the ATM emulated LAN. A logical redundancy virtual channel connection (VCC) is then established between the primary LES/BUS and the backup LES/BUS. When the redundancy VCC is present between the primary LES/BUS and the backup LES/BUS, the backup LES/BUS is placed in a dormant mode. However, when the redundancy VCC is absence between the primary LES/BUS and the backup LES/BUS, the backup LES/BUS is activated to serve any request generated by the ATM emulated LAN.

14 Claims, 4 Drawing Sheets

METHOD AND SYSTEM FOR PROVIDING REDUNDANCY TO ASYNCHRONOUS TRANSFER MODE EMULATED LOCAL-AREA NETWORKS

This application claims benefit to U.S. provisional application No. 60/036,528 filed Jan. 30, 1997.

BACKGROUND OF THE INVENTION

1. Technical Field

The present invention relates to a method and system for data processing in general, and in particular to a method and system for data communications within a local-area network. Still more particularly, the present invention relates to a method and system for providing redundancy to an Asynchronous Transfer Mode emulated local-area network.

2. Description of the Prior Art

For several years, the embedded base of many communication networks have been established according to the IEEE 802 Local-Area Network (LAN) standards, such as the IEEE 802.3 standard for Ethernet LANs and the IEEE 802.5 standard for Token-Ring LANs. These communication networks are considered to be "connectionless" because data packets can be exchanged within these networks without establishing a layer-2 connection under the seven-layer networking reference model established by the International Organization for Standardization (ISO). In addition, the applications within these communications networks typically reside on top of a layer-2 protocol and a layer-3 protocol, such as Medium Access Connection (MAC) and Internet Protocol (IP), respectively.

With the advent of Asynchronous Transfer Mode (ATM) technology, which offers the advantages of fixed-size cell switching, sealablility from a few megabits to hundreds of megabits, the ability to offer guaranteed quality of service on a per connection basis, etc., it is desirable to interconnect a LAN which is still under one of the IEEE 802 LAN standards (or so-called a Legacy LAN) with communication networks that are equipped with ATM capabilities. This type of interconnection has been achieved by a variety of methods, such as bridging-and-routing, that are well-known to those skilled in the art of communications network development. Generally speaking, all these methods provide acceptable results, but as a whole, there is ample room for improvement. For example, some of the methods are based on a broadcast principle that mimics shared-medium operations in which all data packets must be broadcast to all destinations. This method of packet broadcast ends up flooding the entire ATM network with broadcast traffic. Another problem associated with the broadcast principle is that it requires that a mesh of networks be established between all bridges and ATM hosts within a LAN and that all inter-LAN traffic pass through a router, which typically becomes the bottleneck of the LAN.

As a goal to provide a better ATM network solution, the ATM Forum has developed another bridging solution called LAN Emulation (LANE). LANE protocols allow ATM networks to provide the appearance of a LAN-like Ethernet or a LAN-like Token-Ring. A LANE architecture emulates traditional LAN technologies over a switched ATM network. Specifically, LANE relies on a LAN Emulation Server (LES) to perform ATM-to-MAC address translations, and a Broadcast and Unknown Server (BUS) to perform data broadcast. A more detailed description of the LANE technology can be found in *LAN Emulation Over ATM Specifications*, version 1.0, promulgated by the ATM Forum, the content of which is incorporated herein by reference.

Although LANE may not exploit all the benefits of an ATM network, LANE is useful in migrating Legacy LANs to ATM technology, thereby lowering the cost of network management. Nevertheless, a major critique of the LANE architecture is its apparent lack of robustness. At this point, there is no current standard originated by the ATM Forum to define a reliable LANE service that must be provided by a LES/BUS. Thus, if a LES/BUS is not functioning properly, its LAN emulated clients will lose all ability to communicate over the entire communication network that utilizes the LANE architecture. Consequently, it is desirable to provide a more reliable LANE service to insure system integrity of an emulated LAN.

SUMMARY OF THE INVENTION

In view of the foregoing, it is therefore an object of the present invention to provide an improved method and system for data processing.

It is another object of the present invention to provide an improved method and system for data communication within a local-area network.

It is yet another object of the present invention to provide an improved method and system for providing redundancy to an Asynchronous Transfer Mode emulated local-area network.

In accordance with a method and system of the present invention, an Asynchronous Transfer Mode (ATM) emulated local-area network (LAN) is served by a primary LAN Emulation Server, a Broadcast and Unknown Server (LES/BUS), and a LAN Emulation Configuration Server (LECS). A backup LES/BUS is coupled to the ATM emulated LAN. A logical redundancy virtual channel connection (VCC) is then established between the primary LES/BUS and the backup LES/BUS. When the redundancy VCC is present between the primary LES/BUS and the backup LES/BUS, the backup LES/BUS is placed in a dormant mode. However, when the redundancy VCC is absent between the primary LES/BUS and the backup LES/BUS, the backup LES/BUS is activated to serve any request generated by the ATM emulated LAN.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

The present invention is applicable to a variety of data networks such as a local-area network (LAN) or a wide-area network (WAN). The computers within the data networks may be personal computers, workstations, midrange computers, or mainframe computers.

Figure 1:
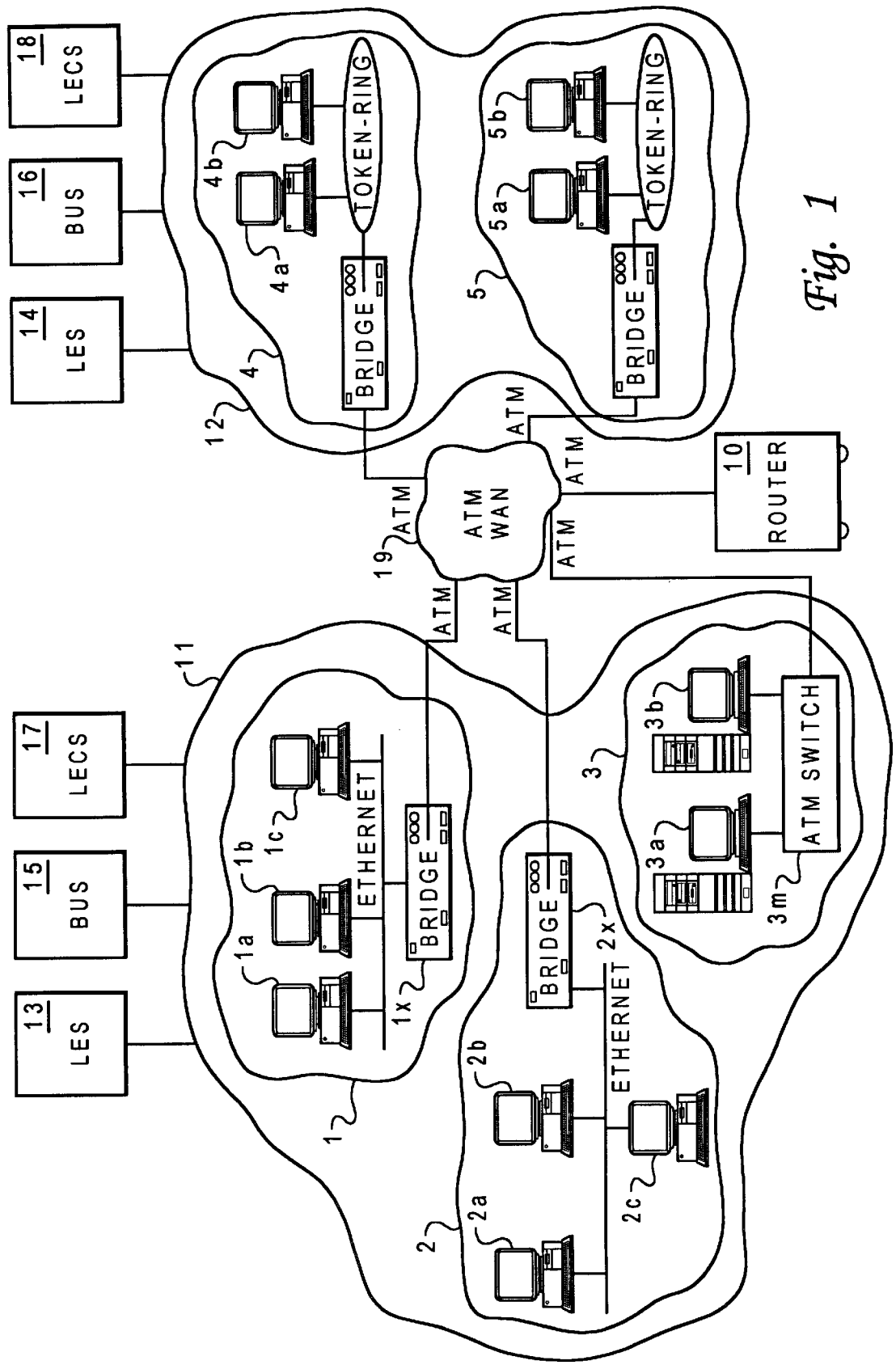
FIG. 1 is a graphical depiction of a LAN emulation architecture in which a preferred embodiment of the present invention may be incorporated.

Referring now to the drawings and in particular to FIG. 1, there is illustrated a pictorial depiction of a LAN emulation (LANE) architecture in which a preferred embodiment of the present invention may be incorporated. As shown, LAN 11 and LAN 12 are two separate emulated LANs. LAN 11, having sites 1, 2, and 3, is interconnected to LAN 12, having sites 4 and 5, via an Asynchronous Transfer Mode (ATM) WAN 19 that is coupled to a router 10. Computers 1a, 1b, and 1c of site 1 may be interconnected to each other via an Ethernet, computers 2a, 2b, and 2c of site 2 may be interconnected to each other via another Ethernet, and workstations 3a and 3b of site 3 are connected to an ATM switch 3m. A similar arrangement is also depicted in LAN 12 having only two sites 4, 5. Computers 4a and 4b of site 4 may be interconnected to each other via a Token-Ring, and computers 5a and 5b of site 5 may be interconnected to each other via another Token-Ring.

LAN 11 is served by a LAN Emulated Server (LES) 13, a Broadcast and Unknown Server (BUS) 15, and a LAN Emulated Configuration Server (LECS) 17, while LAN 12 is served by a LES 14, a BUS 16, and a LECS 18. Because LES 13, BUS 15, and LECS 17 essentially provide similar functions to LAN 1 1 as LES 14, BUS 16, and LECS 18 provide to LAN 12, only LES 13, BUS 15, and LECS 17 will be further described. In order for LES 13 to provide control over LAN 11, a bi-directional connection must be established between a LAN emulated client (LE client) within LAN 11 and LES 13. Generally speaking, a LE client is a bridge or an end-station, for example, bridge 1x, that is directly connected to an ATM network. Once the LE client has obtained an LES address from LECS 17, the LE client then utilizes a join procedure to become a member of LAN 11. During the join procedure, the LE client identifies its addressees), requests membership in LAN 11, and conveys characteristics such as LAN type, proxy status, etc. After the LE client has joined and registered with LES 13, LES 13 can start to provide information such as ATM addresses and MAC addresses to the LE client. Also, LES 13 can utilize the registered information of the LE client to resolve MAC addresses to ATM addresses or to forward any resolution requests. BUS 15 provides a connectionless data forwarding function such as data broadcasting, multicasting, and unicasting to any registered LE client. The LE client is also responsible for setting up a bi-directional connection to BUS 15, over which BUS 15 sends broadcast and multicast traffic to the LE client.

Figure 2:
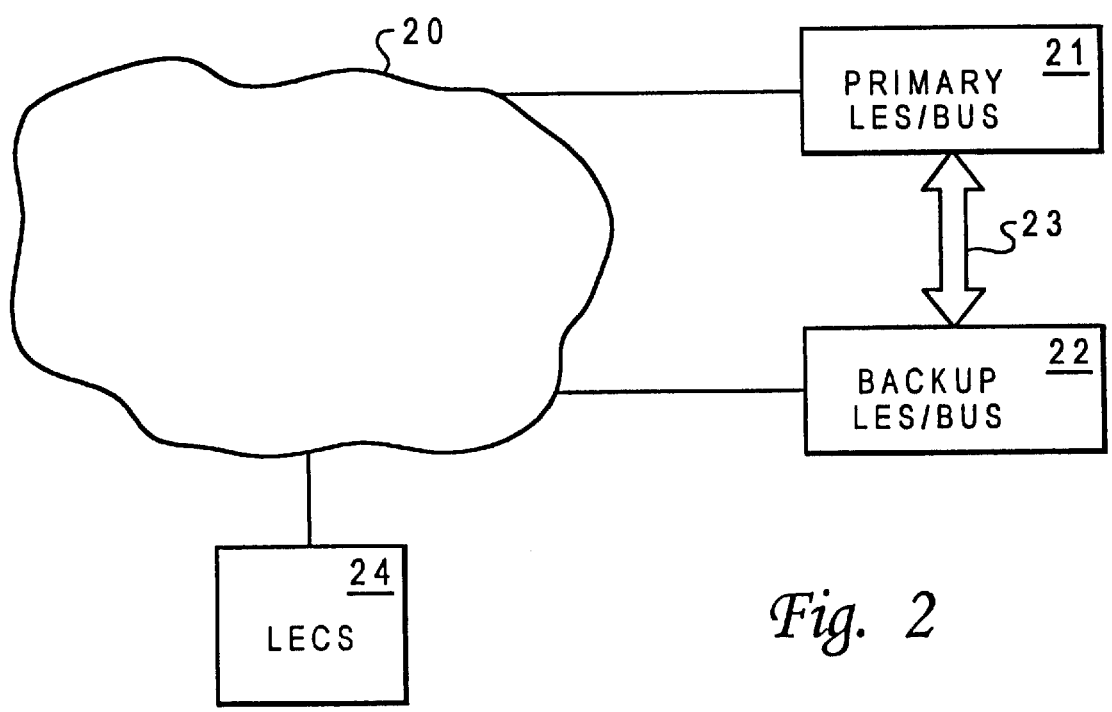
FIG. 2 is a block diagram of an emulated LAN having a primary LES/BUS and a backup LES/BUS, in accordance with a preferred embodiment of the present invention.

As a preferred embodiment of the present invention, a backup LES/BUS may be added to an emulated LAN having a primary LES/BUS. With reference now to FIG. 2, there is illustrated a block diagram of an emulated LAN having a primary LES/BUS and a backup LES/BUS, in accordance with a preferred embodiment of the present invention. As shown, emulated LAN 20 is coupled to a primary LES/BUS 21. Emulated LAN 20 may contain multiple LE clients (not shown). Because every LE client within emulated LAN 20 must connect to an LES as well as a BUS, for the sake of simplicity, LES and BUS are depicted as a single unit in FIG. 2; it should be understood however, that LES and BUS may be implemented either as a single unit or as two separate units as shown in FIG. 1. In addition to primary LES/BUS 21, a backup LES/BUS 22 is also coupled to emulated LAN 20. Furthermore, a logical redundancy virtual control connection (VCC) 23 is established between LES/BUS 21 and LES/BUS 22.

Primary LES/BUS 21 is responsible for maintaining this logical redundancy VCC 23 to backup LES/BUS. The presence of logical redundancy VCC 23 indicates that primary LES/BUS 21 is dutifully serving emulated LAN 20, and backup LES/BUS 22 is in a dormant or hibernation mode. Conversely, if logical redundancy VCC 23 is absent, backup LES/BUS 22 will begin servicing emulated LAN 20 requests in a usual manner according to the *LAN Emulation Over ATM Specification*.

In order for the hand-off from primary LES/BUS 21 to backup LES/BUS 22 to be effective, LE clients within LAN 20 must detect the malfunction of primary LES/BUS 21 and immediately connect to backup LES/BUS 22. An LE client within LAN 20 may detect a malfunction of primary LES/BUS 21 via released VCCs. Although a primary LES/BUS 21 instance could "die" while the signaling and an Interim Local Management Interface (ILMI) component are maintaining established VCCs, this kind of scenario is not at all common. Furthermore, since no mechanism is specified for LE clients within LAN 20 to detect the above-mentioned situation, more elaborate redundancy protocols for the hand-off that allow backup LES/BUS 22 to detect a malfunctioning primary LES/BUS 21 would offer limited benefits.

Connection to primary LES/BUS 21 can be accomplished by configuring a list of LES ATM addresses at each LE client, or more conveniently via an LECS 24. LECS 24 is a component of a LAN emulation service that provides configuration assistance to an LE client that wishes to join emulated LAN 20 and provides administrative assistance to primary LES/BUS 21. When making a configuration request, as mentioned previously, an LE client identifies itself to LECS 24 initially, and may subsequently request its membership in emulated LAN 20 by name. LECS 24 then returns some LAN information to the requesting LE client, including the ATM address of primary LES/BUS 21.

Figure 3:
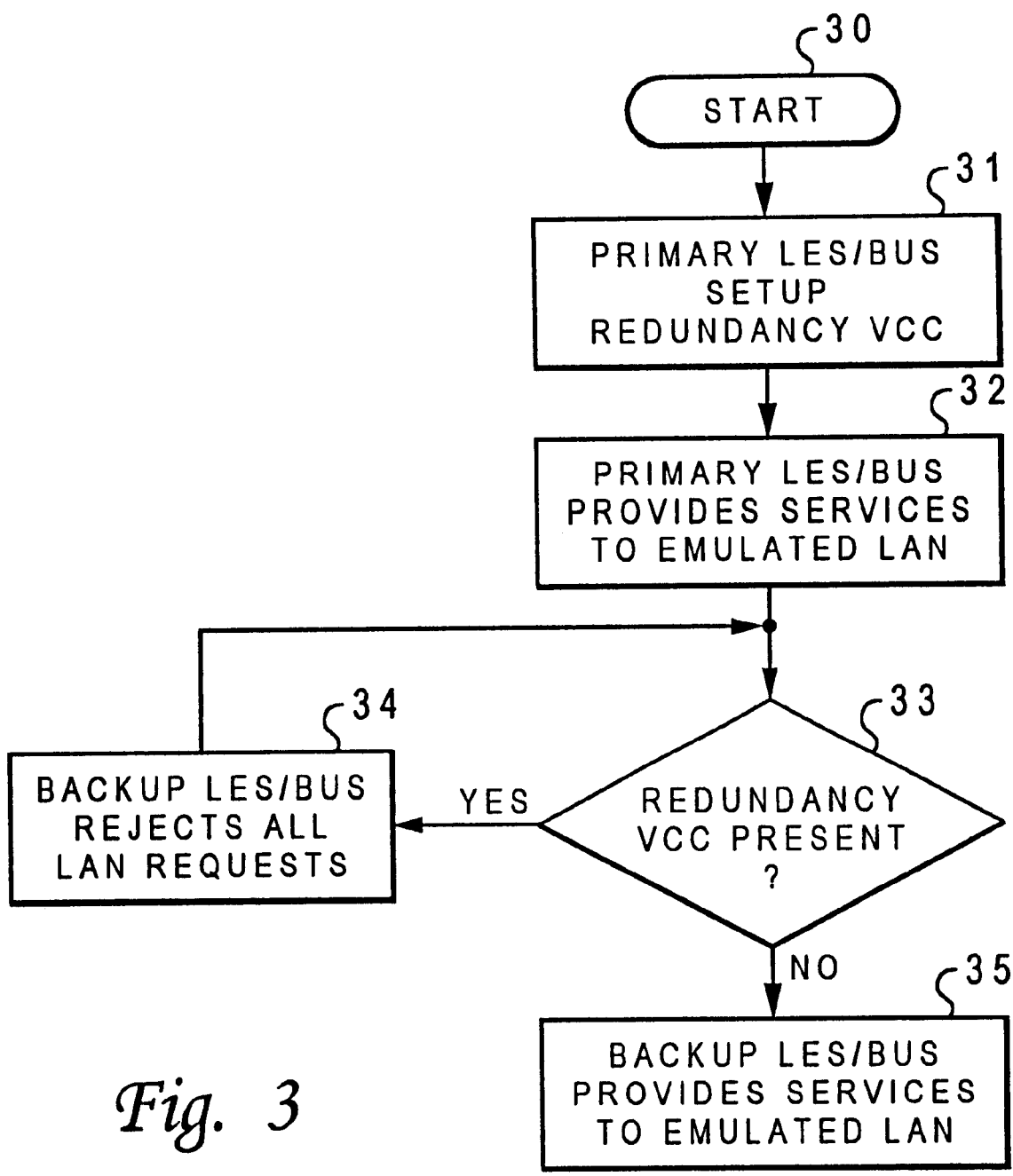
FIG. 3 is a high-level logic flow diagram of a method for providing redundancy to an emulated LAN, in accordance with a preferred embodiment of the present invention.

Referring now to FIG. 3, there is illustrated a high-level logic flow diagram of a method for providing redundancy to an ATM emulated LAN, in accordance with a preferred embodiment of the present invention. Starting at block 30, a logical redundancy VCC is established from a primary LES/BUS to a backup LES/BUS, as shown in block 31. Due to the presence of this logical redundancy VCC, the backup LES/BUS is in a dormant mode. The primary LES/BUS then services all service requests received from an associated emulated LAN, as depicted in block 32. A determination is made as to whether or not the logical redundancy VCC is present between the primary LES/BUS and the backup LES/BUS, as shown in block 33. The presence of this logical redundancy VCC determines which LES/BUS is actually serving the emulated LAN. If the logical redundancy VCC is present between the primary LES/BUS and the backup LES/BUS, the backup LES/BUS will reject all incoming requests from the emulated LAN, as depicted in block 34. However, if the logical redundancy VCC is absent between the primary LES/BUS and the backup LES/BUS, the backup LES/BUS will accept all incoming requests from the emulated LAN, as illustrated 35.

In essence, the logical redundancy VCC simply keeps an emulated LAN from becoming partitioned (i.e., when some LE clients are attached to a primary LES/BUS and other LE clients are attached to a backup LES/BUS, but the LE clients attached to the primary LES/BUS cannot communicate with the LE clients attached to the backup LES/BUS). The logical redundancy VCC prevents LAN partitioning from occurring because the backup LES/BUS will not accept a request from any LE client when the logical redundancy VCC from the primary LES/BUS is present, which forces all LE clients to the primary LES/BUS as long as the primary LES/BUS is active. In fact, even when the backup LES/BUS is servicing LE clients from the emulated LAN after the primary LES/BUS became inactive, the backup LES/BUS will immediately terminate the memberships of all its LE clients if the primary LES/BUS becomes active and establishes a logical redundancy VCC again. In other words, all LE clients will be forced to rejoin the emulated LAN with the primary LES/BUS whenever the primary LES/BUS is active. Given this requirement, a mechanism for the LE clients to attempt to connect to different LES/BUSs with different ATM addresses is needed.

An easy method of implementing the above-mentioned mechanism entails simply configuring a list of LES/BUS ATM addresses at each LE client. But most LE clients that are in the field today do not support this mode of operation. Moreover, configuring a list of ATM addresses in each LE client may require a large amount of configuration work because there may be many LE clients in an emulated LAN. A much more convenient and interoperable approach is to utilize the LECS to provide different LES/BUS ATM addresses. There are two situations that must be considered. The first situation is when the LECS is co-located with one of the primary and backup LES/BUS instances and the second is when the LECS is executing in a computer system that is physically separated from the computer system in which the LES/BUSs are executing. In the first case, the LECS knows exactly the state of the LES/BUSs by simply querying the co-located LES/BUS instances. In the second case, however, the LECS does not know the state of the LES/BUSs. Thus, a heuristic algorithm is required to determine the state of the LES/BUSs. When an LE client makes a repeated configuration request within a short period of time, the LECS assumes the reason for that is the LES/BUS whose address was last provided is not active. Therefore, the LECS toggles between the primary and backup LES/BUS ATM addresses. This toggling coupled with the logical redundancy VCC provides a self-correcting solution. If the LECS makes a mistake and assigns a LE client to the backup LES/BUS when the primary LES/BUS is still active, the backup LES/BUS will reject an LE client's request to join the emulated LAN, which forces the LE client to repeat the configuration phase again. At this point, the LECS can correct the mistake by toggling back to the ATM address of the primary LES/BUS for the LE client. If there is no history for a given LE client, the LECS will select the ATM address of the primary LES/BUS for the LE client because this is typically the correct choice under normal conditions.

Figure 4:
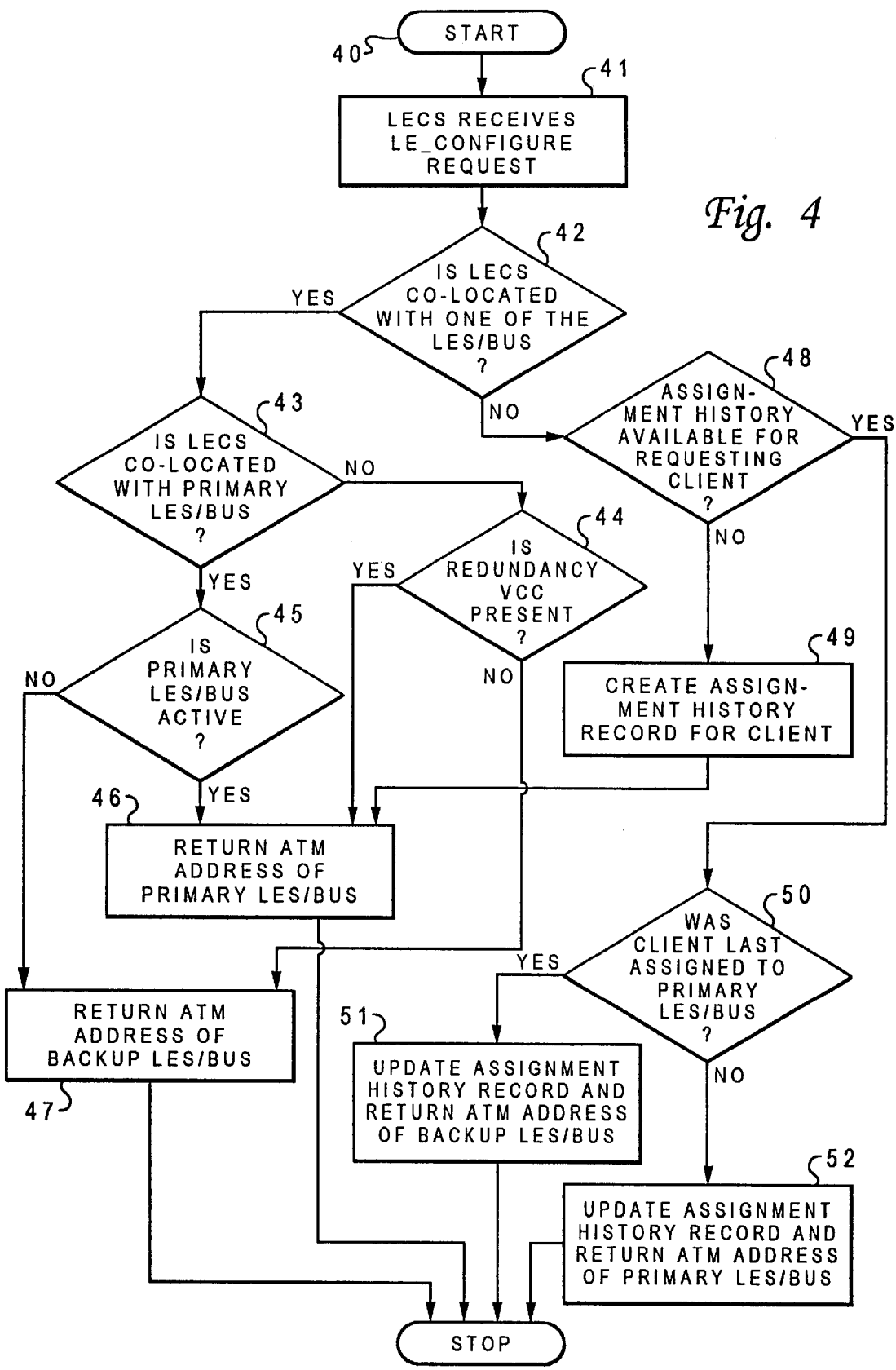
FIG. 4 is a high-level logic flow diagram of a mechanism for LE clients to toggle between a primary LES/BUS and a backup LES/BUS, in accordance with a preferred embodiment of the present invention.

With reference now to FIG. 4, there is illustrated a high-level logic flow diagram of a mechanism for LE clients to toggle between a primary LES/BUS and a backup LES/BUS, in accordance with a preferred embodiment of the present invention. Starting at block 40, LECS receives a LE_CONFIGURE request from a LE client, as shown in block 41. A determination is made as to whether or not the LECS is co-located with a LES/BUS, as depicted in block 42. If yes, another determination is made as to whether or not the LECS is co-located with primary LES/BUS, as illustrated in block 43. If the LECS is co-located with a primary LES/BUS and the primary LES/BUS is active (as determined in block 45) an ATM address of the primary LES/BUS is returned, as shown in block 46. Otherwise, if the LECS is co-located with a primary LES/BUS but the primary LES/BUS is not active (as determined in block 45) an ATM address of a backup LES/BUS is returned, as shown in block 47.

If the LECS is not co-located with the primary LES/BUS, another determination is made as to whether or not a logical redundancy VCC is present, as shown in block 44. If the logical redundancy VCC is present, an ATM address of the primary LES/BUS is returned, as shown in block 46. Otherwise, if the logical redundancy VCC is not present, an ATM address of a backup LES/BUS is returned, as shown in block 47.

However, if the LECS is not co-located with a LES/BUS, a determination is made as to whether or not an assignment history is available for the requesting LE client, as shown in block 48. If not, an assignment history record will be created for the requesting LE client, as depicted in block 49, and an ATM address of the primary LES/BUS is returned, as illustrated in block 46. If an assignment history is available, another determination is then made as to whether or not the requesting LE client was last assigned to the primary LES/BUS, as shown in block 50. If the requesting LE client was last assigned to the primary LES/BUS, the assignment history record is updated and the ATM address of the backup LES/BUS is returned to, as depicted in block 51. If the requesting LE client was last assigned to the backup LES/BUS, the assignment history record is updated and the ATM address of the primary LES/BUS is returned, as depicted in block 52.

In sum, the LECS maintains a short-memory of the LES ATM address last provided to each LE client (i.e., the assignment history record is deleted after a short period of time if it is not updated). If the LECS has no history for a given LE client, the ATM address of a primary LES/BUS will be provided in response to a LE_CONFIGURE_REQUEST by the LE client. Otherwise, the LECS will alternate between the primary LES/BUS and the backup LES/BUS. This simple heuristic makes the proper assignment in the nominal case of no malfunction, and is self-correcting.

As has been described, the present invention provides an improved LANE service that is more robust and more reliable over the standard LANE service described in *LAN Emulation Over ATM Specification*. Certain vendors may have certain proprietary redundancy solutions for providing a redundant service; however, these proprietary redundancy solutions are only for LE clients that possess proprietary extensions. Thus, not only must all LANE services be provided by the vendor, but also all LE clients must be provided by the vendor. On the other hand, the solution provided by the present invention does not require that any proprietary extensions be implemented by LE clients. Thus, any ATM Forum-compliant LE client can utilize the solution provided by the present invention.

It is also important to note that although the present invention has been described in the context of a computer system within a network, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for providing redundancy to an Asynchronous Transfer Mode (ATM) emulated local-area network (LAN), wherein said ATM emulated LAN is served by a primary LAN Emulation Server, a Broadcast and Unknown Server (LES/BUS), and a LAN Emulation Configuration Server (LECS), said method comprising the steps of:

coupling a backup LES/BUS to said ATM emulated LAN;

establishing a logical redundancy virtual connection control (VCC) between said primary LES/BUS and said backup LES/BUS, wherein said primary LES/BUS and said backup LES/BUS are both coupled to said ATM emulated LAN;

placing said backup LES/BUS in a dormant mode when said logical redundancy VCC is present between said primary LES/BUS and said backup LES/BUS; and in response to an absence of said logical redundancy VCC between said primary LES/BUS and said backup LES/BUS, activating said backup LES/BUS to service any request generated by said ATM emulated LAN.

2. The method according to claim 1, wherein said method further includes a step of activating said primary LES/BUS to serve any request generated from said ATM emulated LAN, in response to a presence of another logical redundancy VCC between said primary LES/BUS and said backup LES/BUS.

3. The method according to claim 1, wherein said establishing step further includes a step of establishing a logical redundancy VCC by said primary LES/BUS.

4. The method according to claim 1, wherein said method further includes a step of querying a state of one of said LES/BUSs by said LECS if one of said LES/BUSs is co-located with said LECS.

5. The method according to claim 1, wherein said method further includes a step of determining a state of one of said LES/BUSs by said LECS if neither of said LES/BUSs is co-located with said LECS.

6. An Asynchronous Transfer Mode (ATM) emulated local-area network (LAN) having power redundancy, wherein said ATM emulated LAN is served by a primary LAN Emulation Server, a Broadcast and Unknown Server (LES/BUS), and a LAN Emulation Configuration Server (LECS), said ATM emulated LAN comprising:

a backup LES/BUS coupled to said ATM emulated LAN;

a logical redundancy virtual connection control (VCC) established between said primary LES/BUS and said backup LES/BUS, wherein said primary LES/BUS and said backup LES/BUS are both coupled to said ATM emulated LAN;

means for placing said backup LES/BUS in a dormant mode when said logical redundancy VCC is present between said primary LES/BUS and said backup LES/BUS; and means for activating said LES/BUS to serve any request generated from said ATM emulated LAN, in response to an absence of said logical redundancy VCC between said primary LES/BUS and said backup LES/BUS.

7. The ATM emulated LAN according to claim 6, wherein said ATM emulated LAN further includes a means for activating said primary LES/BUS to serve any request generated from said ATM emulated LAN, in response to a presence of another logical redundancy VCC between said primary LES/BUS and said backup LES/BUS.

8. The ATM emulated LAN according to claim 6, wherein said logical redundancy VCC is established by said primary LES/BUS.

9. The ATM emulated LAN according to claim 6, wherein said ATM emulated LAN further includes a means for querying a state of one of said LES/BUSs by said LECS if one of said LES/BUSs is co-located with said LECS.

10. The ATM emulated LAN according to claim 6, wherein said ATM emulated LAN further includes a means for performing a heuristic algorithm to determine a state of one of said LES/BUSs by said LECS if neither of said LES/BUSs is not co-located with said LECS.

11. A computer program product for providing redundancy to an Asynchronous Transfer Mode (ATM) emulated local-area network (LAN), wherein said ATM emulated LAN is served by a primary LAN Emulation Server, a Broadcast and Unknown Server (LES/BUS), and a LAN Emulation Configuration Server (LECS), said computer program product comprising:

program code means for coupling a backup LES/BUS to said ATM emulated LAN;

program code means for establishing a logical redundancy virtual connection control (VCC) between said primary LES/BUS and said backup LES/BUS, wherein said primary LES/BUS and said backup LES/BUS are both coupled to said ATM emulated LAN;

program code means for placing said backup LES/BUS in a dormant mode when said logical redundancy VCC is present between said primary LES/BUS and said backup LES/BUS; and program code means for activating said backup LES/BUS to serve any request generated from said ATM emulated LAN, in response to an absence of said logical redundancy VCC between said primary LES/BUS and said backup LES/BUS.

12. The computer program product according to claim 11, wherein said computer program product further includes a program code means for activating said primary LES/BUS to serve any request generated from said ATM emulated LAN, in response to a presence of another logical redundancy VCC between said primary LES/BUS and said backup LES/BUS.

13. The computer program product according to claim 11, wherein said computer program product further includes a means for querying a state of one of said LES/BUSs by said LECS if one of said LES/BUSs is co-located with said LECS.

14. The computer program product according to claim 11, wherein said computer program product further includes a program code means for performing a heuristic algorithm to determine a state of one of said LES/BUSs by said LECS if neither of said LES/BUSs is not co-located with said LECS.

* * * * *